United States Patent [19]
Scheuermann

[11] 3,909,865
[45] Oct. 7, 1975

[54] CAR WASH APPARATUS
[76] Inventor: Kurt P. Scheuermann, 211 Eastbourne Terrace, Moorestown, N.J. 08057
[22] Filed: Aug. 27, 1973
[21] Appl. No.: 391,627

[52] U.S. Cl. .............................. 15/21 D; 15/DIG. 2
[51] Int. Cl.² ............................................. B60S 3/06
[58] Field of Search ............. 15/DIG. 2, 21 D, 21 E, 15/53

[56] References Cited
UNITED STATES PATENTS

| | | | |
|---|---|---|---|
| 3,035,293 | 5/1962 | Larson | 15/21 D |
| 3,292,192 | 12/1966 | Maxwell | 15/21 D |
| 3,432,870 | 3/1969 | Emanuel et al. | 15/21 D |
| 3,501,794 | 3/1970 | Solomon | 15/21 D |
| 3,626,538 | 12/1971 | Scheuermann | 15/21 D |
| 3,783,466 | 1/1974 | Bernardi | 15/21 E |
| 3,816,869 | 6/1974 | Ennis | 15/21 D |

FOREIGN PATENTS OR APPLICATIONS 1,465,933   12/1966   France ............................. 15/DIG. 2

*Primary Examiner*—Edward L. Roberts
*Attorney, Agent, or Firm*—Smith, Harding, Earley & Follmer

[57] ABSTRACT

Car wash apparatus in which an overhead brush is mounted on a horizontal axis for washing the front bumper and grill of the car as well as the hood, roof and trunk of the car. The brush is pivotally mounted on a pivot above the path of travel of the car and is supported on arms extending from the pivot in the direction of car movement through the car wash and then downwardly to support the brush at a lower end of the arms.

10 Claims, 10 Drawing Figures

U.S. Patent  Oct. 7,1975  Sheet 1 of 2  3,909,865

CAR WASH APPARATUS

BACKGROUND OF THE INVENTION

This invention relates generally to car washing equipment and particularly to apparatus for supporting an overhead brush which is arranged to wash the front portion of the car comprising the bumper and grill as well as the top portion of the car including the hood, roof and trunk thereof.

Car washing apparatus in use today employ a "wrap-around" brush arrangement for cleaning the front bumper and grill of the car. This brush arrangement involves a pair of brushes mounted to rotate on a vertical axis and supported on pivots on the side of the car and guided to move across the front of the car to clean the front bumper. These brushes are arranged in staggered relation so that each brush is positioned for washing half of the front portion of the car. Such an arrangement requires at least 12 feet along the length of the car wash apparatus which is a disadvantage when it is desired to provide a compact arrangement. Moreover, the "wrap-around" brushes are not entirely satisfactory for the cleaning of the extended bumpers of the new model cars.

SUMMARY OF THE INVENTION

It is the general object of the invention to provide a car wash apparatus wherein an overhead brush is used to clean the front portion of the car including the front bumper and grill as well as the top portion of the car including the hood, roof and trunk. Briefly stated, this is achieved by the provision of apparatus for supporting a rotating brush on a pivot means located above the path of travel of the car. A brush supporting frame means is pivotally mounted on the pivot means for supporting a rotating brush to extend transversely across the path of travel of the car on a horizontal axis. The frame means comprises support arms having a first portion extending from the pivot means in the direction of car travel and a second portion turned downwardly to said horizontal axis of the brush. The arrangement is such that the brush can be moved from a lower position near the ground whereat the brush is in position to clean the front bumper and grill of the car upwardly and forwardly in the direction of car travel to an upper position above the top portion of the car whereat said brush is in position to clean this top portion.

Another object of the invention is to provide a compact car wash apparatus comprising a pair of overhead brushes. The first overhead brush is mounted on a pivoted frame extending from an overhead pivot therefor in a direction opposite the movement of the car through the car wash whereby this brush is capable of washing the top portion and rear portion of the car and is mounted for movement downwardly in the direction of car movement to achieve the cleaning action of the rear portion of the car. The second overhead brush is mounted on a pivoted frame as is described in the preceding paragraph and is adapted to clean the front portion of the car including the front bumper and grill and the top portion of the car. This arrangement involving only two overhead brushes provides a very compact car wash arrangement and one which can perform an effective cleaning operation.

DESCRIPTION OF THE PREFERRED EMBODIMENTS

The apparatus in accordance with the invention is designed for utilization with conventional car wash equipment. Thus, while the following description is directed to apparatus for washing the top, front and rear portions of the car, it will be apparent the other parts of the car may be cleaned, washed and dried with conventional equipment. As is conventional in the art, the car is connected to a conveyor which pulls the car in a straight path through the car wash through the various cleaning, washing and drying stations. Such means are conventional and form no part of the present invention which relates to the construction and arrangement of apparatus for supporting a rotating brush which is adapted to clean the grill and front bumper of the car as well as the top portion of the car as it passes a cleaning station.

Figure 1:
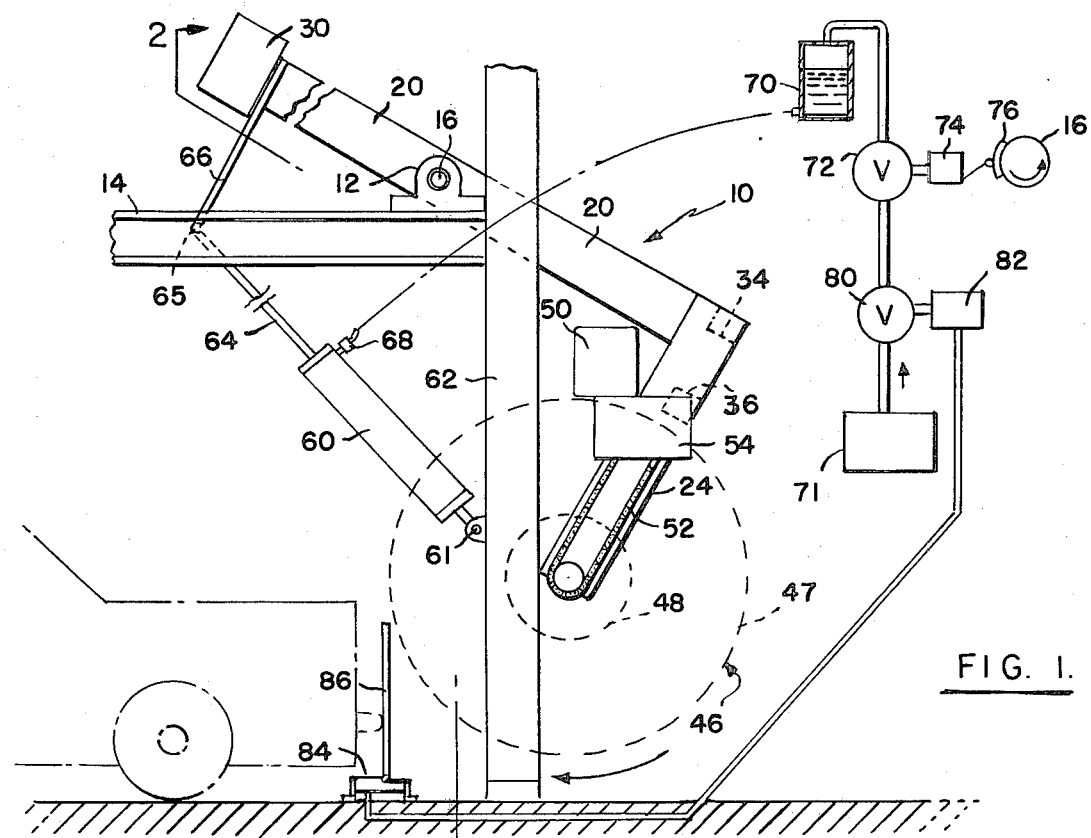
FIG. 1 is a side elevation of the apparatus in accordance with the invention.
Figure 2:
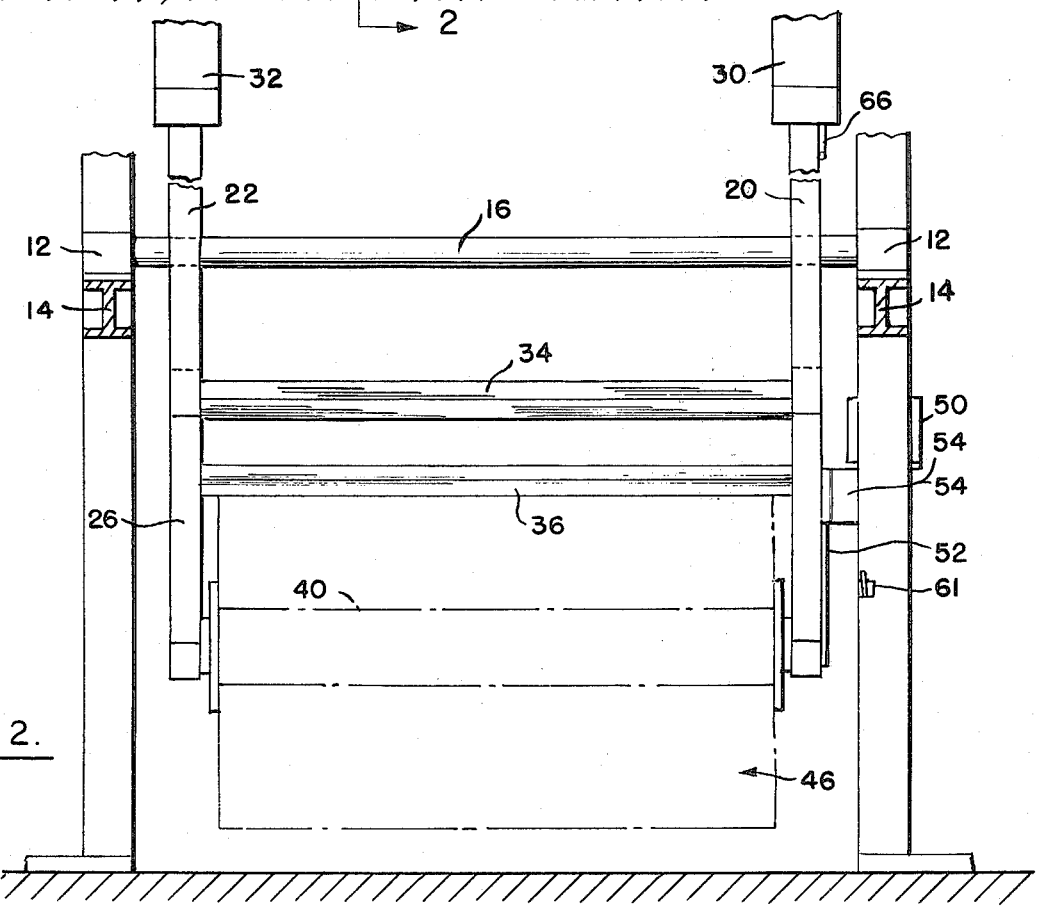
FIG. 2 is a front elevation of the arrangement shown in FIG. 1 taken on line 2—2 of FIG. 1.

Referring to FIGS. 1 and 2, the apparatus in accordance with the invention comprises a pivoted frame indicated generally at 10 mounted above the path of travel of the car through the car wash on a pair of pivot means 12 supported on horizontal members 14 of the main frame of the car wash. The frame 10 includes a pivot bar 16 which extends on a horizontal axis between the pivot means 12 which preferably comprise suitable journal bearings. The axis of the pivot bar 16 is transverse to and located above the path of travel of the car through the car wash (indicated by the arrow 18 in FIG. 1). A pair of elongated arms 20 and 22 are mounted at a medial location thereof on the pivot bar 16 for movement therewith as the pivot bar 16 rotates in its pivots 12. The arms 20 and 22 are arranged in parallel spaced relation in planes parallel to the path of movement of the car through the car wash. The arms 20 and 22 are spaced apart a distance which is desirably somewhat greater than the width of the largest vehicle to be washed by the car wash apparatus. Secured, as by welding, on the ends of arms 20 and 22 are a pair of downwardly extending arm portions 24 and 26, respectively. Said portions 24 and 26 forming a right angle with respect to the portions of arms 20 and 22 extending directly from the pivots 12 as is seen in FIG. 1. The other ends of arms 20 and 22 are provided with counterweights 30 and 32, respectively, for balancing the frame 10.

A pair of cross members 34 and 36 extend between the arm portions 24 and 26 at the locations shown in FIGS. 1 and 2. These cross members 34 and 36 serve to impart a rigid and stable structure to the frame 10.

At their lower ends arm portions 24 and 26 carry a brush shaft 40 which is rotatably mounted at its ends in a pair of bearings 42 and 44 mounted on the lower ends of the members 24 and 26, respectively. The brush shaft 40 is adapted to rotatably support a brush 46 as shown in dashed lines.

The brush 46 comprises generally conventional components and may comprise a first group of bristle elements 47 embedded in the shaft 40 and extending therefrom to provide a brush diameter of approximately 5 feet and a second group of bristle elements 48 extending from the shaft 40 to provide an outer diameter of 2½ feet. The length of brush 46 is greater than the width of the largest vehicle to be washed.

The brush 46 is preferably a light density type filled about two-thirds with the longer bristle elements 47 and one-third with the shorter bristle elements 48, the latter being clustered together at a medial location of the brush. By this construction, the short length bristles 47 help limit the depth of penetration of the car into the brush. If the car should penetrate too deeply into the brush the cleaning action will be impaired and it could be difficult to force the removal of the brush from the front portion of the car by the movement of the car through the car wash.

The counterweights 30 and 32 are designed to approximately balance the weight of the brush 46 and the supporting framework therefor. Accordingly, the frame 10 is maintained in a balanced condition on the pivot bar 16. It is noted that the counterweights 30 and 32 are constructed so that the parts will normally take the null position as shown in FIG. 1 with the brush 46 in a lower position close to the ground in preparation for contact with the front portion of a car approaching in the direction of the arrow 18.

Means are provided for causing rotation of the brush shaft 40. Such means comprises an electric motor 50 suitably mounted on the arm portion 24 and drivingly connected to an endless drive chain 52 through a suitable speed reducer 54. The drive chain 52 is connected to a sprocket on the end of the brush shaft 40 which is rotated in the direction of the arrows shown in the drawings. It will be noted that the drive means for the brush 46 is movable with the frame 10.

As was discussed above, there could be difficulty in removing the brush from the front portion of the car. This is because the frictional forces developed by reason of the rotation of the brush into the car as is shown in FIG. 1, cause the brush to move downwardly. Accordingly, power operated means are provided for raising the frame 10 at a desired time in the washing procedure. Such means comprises a hydraulic cylinder 60 which at one end is pivotally mounted on a pivot means 61 on an upright member 62 of the main frame of the car wash. The extended end of the actuator arm 64 of cylinder 60 is pivotally connected at 65 to an arm 66 secured, as by welding, to the arm 20. Hydraulic fluid is supplied to one end of cylinder 60 by way of a hose connection 68 from a supply of hydraulic fluid in a container 70. The hydraulic fluid is delivered to the cylinder 60 on one side of a piston therein, which piston is connected to the actuator arm 64. Air under pressure is applied to the upper portion of container 70 from a source 71 to cause the hydraulic fluid to move into the cylinder 60 to cause the actuator rod to be retracted when it is desired to effect a pivoting action of the frame 10.

Suitable means are provided for controlling the flow of air to the cylinder 70. Such means comprises a valve 72 which is controlled by a cam actuated switch 74, a cam 76 being mounted for rotation with the bar 16 for the pivoted frame 10. The valve 72 is opened only during the time when the cam 76 is in engagement with the cam follower portion of the switch 74. The flow of air pressure is also under the control of the valve 80 which is controlled by a suitable control means 82 which is actuated by means of a switch 84 which is controlled by a feeler or wand 86 which is arranged to contact the front bumper of the car. The switch 84 is designed to cause the opening of valve 80 after the wand 86 has moved a distance by the car so that the car will have moved into contact with the bristles of the brush. At this time, the valve 80 is opened by the control means 82 and the cam 76 will be in a position such as is shown in FIG. 1. Also operating at this time is the control means 74 to maintain valve 72 in an open position. The application of the hydraulic fluid will cause the actuator arm 64 of cylinder 60 to be retracted gradually thereby causing the frame 10 to pivot in a counterclockwise direction about its axis as viewed in FIG. 1. This serves to insure that the brush is raised gradually while achieving an effective cleaning action. This pivoting action will continue for a predetermined amount of pivoting of the frame 10 so as to raise the axis of the brush approximately 10 inches for a typical application. This will be sufficient to avoid the possibility of the brush getting caught on the front part of the automobile. When the shaft 16 has pivoted this desired amount, the switch 74 will be tripped to a condition causing valve 72 to close and remove the application of force to the frame by way of the cylinder 60. The frame now is free to take a normal position determined by the counterweight and any other control means that may be provided as desired.

Figure 3A:
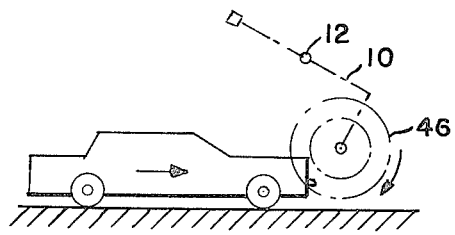
FIGS. 3A through 3F are schematic illustrations showing the sequential stages of car movement through the car washing apparatus and illustrating the car washing action in accordance with the invention.

The operation of the apparatus shown in FIGS. 1 and 2 is illustrated in FIGS. 3A through 3F. In FIG. 3A the apparatus is shown in the condition when the brush 46 has just come into contact with the front bumper and grill of the car, the parts assuming the position generally shown in this figure. It will be noted that the brush 46 can move deeply into the front end of the car to achieve a good cleaning action. Moreover, the inward movement of the brush is limited by the short length bristles 48 and the power operated means 60 so that the bristles will not be compressed too much.

Figure 3B:
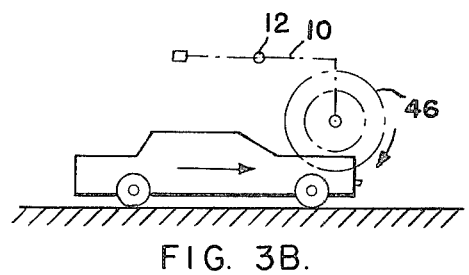

In FIG. 3B the brush 46 is shown in the condition whereat it is cleaning the hood of the car. It will be noted that in the movement from the position of 3A to the position of FIG. 3B the brush 46 has moved in a direction upwardly in the direction of car movement.

Figure 3C:
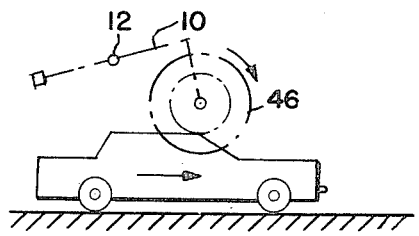

In FIG. 3C the brush 46 is shown in the position for cleaning the windshield and roof of the car.

Figure 3D:
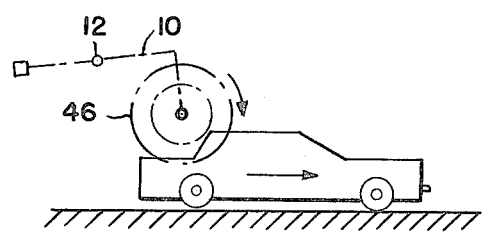

In FIG. 3D the brush 46 is shown in the position for washing the rear window and trunk of the car.

Figure 3E:
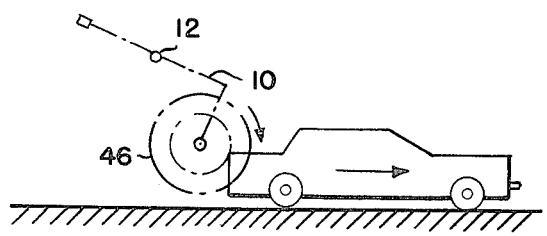

In FIG. 3E the brush 46 is shown in the condition for washing the rear portion of the car.

Figure 3F:
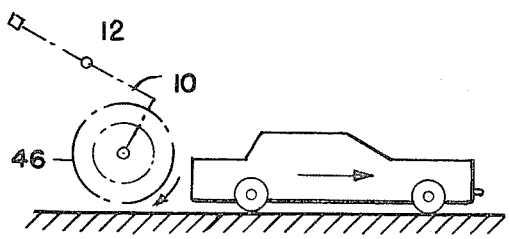

In FIG. 3F the car has moved past the brush 46 and the brush 46 is maintained in the null position in preparation for coming into cleaning contact with the next car which is moved through the car wash apparatus.

It will be apparent that the overhead brush arrangement in accordance with the invention will take up considerably less space along the car wash than the "wraparound" brushes of present day car washes. Moreover, the extended bumpers can be satisfactorily washed with the apparatus in accordance with the invention since the bristles can be forced effectively into the grill and front bumper portions of the car and can be maintained in this condition for a sufficient length of time to achieve the cleaning.

Figure 4A:
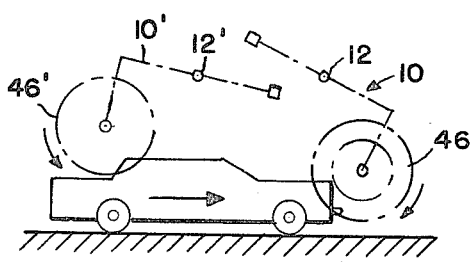
FIGS. 4A and 4B are schematic illustrations showing sequential stages of car movement through a car wash comprising two overhead brushes.
Figure 4B:
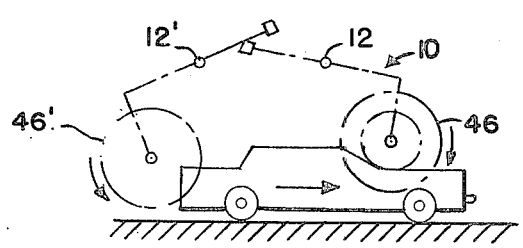

Another advantage of the apparatus in accordance with the invention is that it can be combined with the car wash apparatus in accordance with my U.S. Pat. No. 3,626,538 to achieve a very compact and effective car wash apparatus. This arrangement is shown in FIGS. 4A and 4B. In this embodiment of the invention there is provided a pivoted frame 10' essentially similar to the frame 10 described above. The frame 10' is mounted to extend from the pivot 12' thereof in the direction opposite to the movement of the car through the car wash in the manner and for the purposes described in my prior patent and carries a rotating brush 46'. As is described in my prior patent, this arrangement achieves a very effective car washing action of the trunk of the car since the brush 46' is moved along with the car to maintain its contact with the rear end as the car moves past this cleaning station. In other words, the brush 46' is supported for movement downwardly and forwardly in the direction of travel of the car past the cleaning station whereat frame 10' is located. The frame 10' and brush 46' serve to wash the top portion of the car as well as the rear portion thereof while the frame 10 is provided at a cleaning station for cleaning the front portion of the car including the bumper and grill as well as the top portion of the car in the manner described above. The parts are arranged to provide for clearance between the counterweights for each of the frames 10 and 10'. The arrangement shown in FIGS. 4A and 4B is so compact that a complete car wash apparatus comprising the frame means 10 and 10' has been made to require only twenty feet from brush end to brush end.

The operation of this compact car wash apparatus is illustrated in FIGS. 4A and 4B. In FIG. 4A the car is shown in a position whereat the brush 46 is in position to clean the grill and front bumper of the car. In this condition the brush 46' has already washed the hood and roof of the car and is in a position for washing the rear window and trunk of the car. The brushes 46 and 46' rotate in the directions indicated by the arrows in FIGS. 4A and 4B.

In FIG. 4B the car has advanced to the position whereat the brush 46 is washing the front window of the car while the brush 46' is cleaning the trunk of the car. The car will then advance from this position to complete the cleaning action of the brush 46' as is illustrated in FIGS. 3C through 3E above.

Another advantage of the overhead brush arrangement in accordance with the invention is that vans having high verticle front and rear shapes and small cars, such as Volkswagons, having sloped front and rear shapes can be washed effectively. The "wrap-around" brush arrangements of the prior art are unsatisfactory for washing vehicles of this type.

It will be apparent that various changes can be made in the construction and arrangement of parts without departing from the scope of the invention. For example, the location and arrangement of the counterweight means may take various forms. Accordingly, it is not desired to be limited except as required by the following claims.

What is claimed:

1. For use in a car wash in which a car is moved along a path of travel through the car wash and past a cleaning station for the front bumper and grill and for the top portion of the car, apparatus for supporting a rotating brush at said station comprising pivot means located above the path of travel of the car, means supporting said pivot means at a fixed location, a brush supporting frame means pivotally mounted on said pivot means, said frame means having means for rotatably supporting a brush extending on a horizontal axis transversely across the path of travel of the car and support arm means having a first portion rotatable about said pivot means and extending from said pivot means in the direction of car travel and a second portion turned downwardly to said horizontal axis of said brush for supporting said means for rotatably supporting the brush, said support arm means being constructed and arranged to move said brush from a lower position near the ground whereat said brush is in position to clean the front bumper of the car upwardly and forwardly in the direction of car travel to an upper position above the top portion of the car whereat said brush is in position to clean said top portion, means for rotating said brush into the front portion of the car with the periphery of the brush moving upwardly thereacross as the car moves into the brush, and control means responsive to the movement of the front bumper of the car into contact with the brush for applying a force to said frame to overcome the frictional forces produced by said brush engaging the front bumper for raising said brush.

2. Apparatus according to claim 1 wherein in said lower position of the brush, said second support arm portion extends in a downward direction opposite to the direction of travel of the car.

3. Apparatus according to claim 2 wherein said first and second arm portions extend substantially at right angles to one another.

4. Apparatus according to claim 3 wherein said frame means comprises means for providing a counterweight to said support arm portions and the brush supported thereby.

5. Apparatus according to claim 4 wherein said support arm means includes a pair of arms, one arm being located on each side of the path of car travel and at least one cross member extending between said second portions of said arms for imparting structural rigidity to said frame means.

6. Apparatus according to claim 1 wherein said control means includes power operated cylinder means for applying a force to said frame for raising said brush at a predetermined time.

7. Apparatus according to claim 6 including means for controlling operation of said power operated means including means for sensing the movement of a car toward said brush.

8. Apparatus according to claim 3 wherein said support arm means includes a pair of arms, one arm being located on each side of the path of car travel and at least one cross member extending between said second portions of said arms for imparting structural rigidity to said frame means.

9. A car wash in which a car is moved along a path of travel through the car wash past a first cleaning station for the top and rear portions of the car and a second cleaning station for the top and front portions of the car comprising apparatus at said first station for rotatably supporting a brush including pivot means located above and on an axis transverse to the path of travel of the car, a brush supporting frame means pivotally mounted on said pivot means, said frame means having means for supporting a rotating brush to extend transversely across the path of travel of the car on a horizontal axis, said frame means including brush support arms extending from the pivot in the direction opposite to the direction of movement of the car through said car wash and carrying the brush on an extended portion thereof so that the brush is supported for movement downwardly and forwardly in the direction of travel of the car past said first cleaning station, and apparatus at said second station for supporting a rotating brush thereat comprising pivot means located above and on an axis transverse to the path of travel of the car through the car wash, a brush supporting frame means pivotally mounted on said pivot means, said frame means having means for supporting a brush to extend transversely across the path of travel of the car on a horizontal axis, said support means having supporting arms extending from said pivot in the direction of travel of the car through said car wash for supporting said brush so that it is moved from a lower position near the ground whereat said brush is in position to clean the front bumper of the car upwardly in the direction of car travel to an upper position above the top portion of the car whereat said brush is in position to clean said top portion, control means responsive to the movement of the car toward said brush for the second station for applying a force to the supporting frame means therefor for raising the same when said brush is in contact with the front bumper of the car, means for rotating said first station brush in a direction about its horizontal axis whereby the periphery of the brush moves upwardly across the rear portion of the car as the car moves past said first station, and means for rotating said second station brush into the front portion of the car with the periphery of the brush moving upwardly thereacross as the car moves into the second station brush.

10. A car wash according to claim 9 wherein said pivot means for said apparatus at said first station is located close to said pivot means for said apparatus at said second station so that the brushes of each said apparatus are concurrently in cleaning contact with a car moving through the car wash.

* * * * *